UNITED STATES PATENT OFFICE.

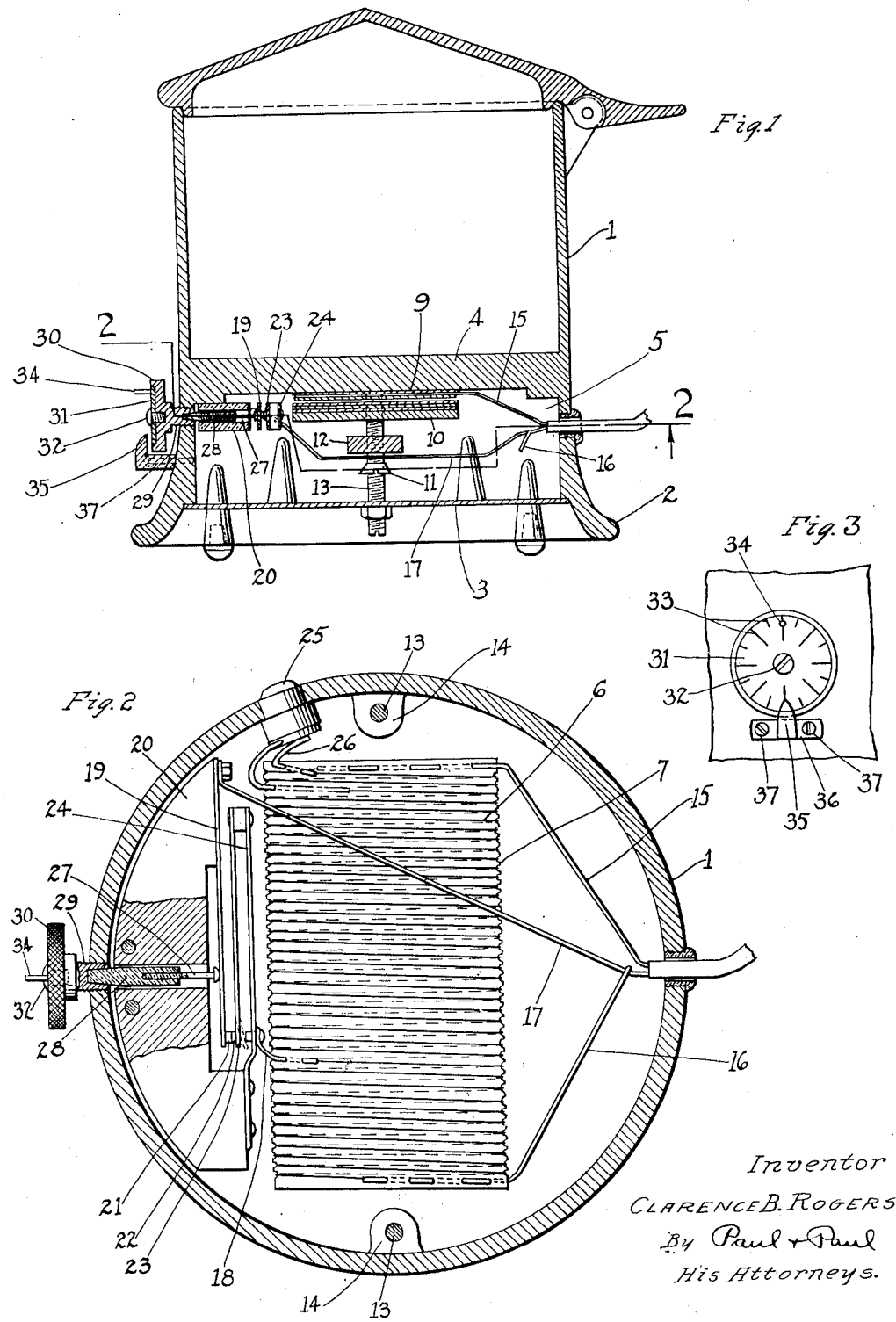

CLARENCE B. ROGERS, OF SEATTLE, WASHINGTON.

ELECTRIC HEATING UNIT.

1,426,411. Specification of Letters Patent. Patented Aug. 22, 1922.

Application filed August 16, 1920. Serial No. 403,795.

*To all whom it may concern:*

Be it known that I, CLARENCE B. ROGERS, a citizen of the United States, resident of Seattle, in the county of King and State of Washington, have invented certain new and useful Improvements in Electric Heating Units, of which the following is a specification.

This invention relates to an improvement in electric heating units and is more particularly directed to an improved thermostatic control for such heating units and to the provision of such thermostatic control as will substantially avoid the disadvantageous arcs such as usually appear at make-and-break electric controls.

The object of the invention is to provide an improved electric heating unit.

Other objects of the invention will more fully appear from the following description and the accompanying drawings, and will be particularly pointed out in the annexed claims.

In the accompanying drawings, there has been disclosed a structure designed to carry out the objects of the invention, but it is understood that the invention is not confined to the exact features shown, as various changes may be made within the scope of the claims which follow.

In the drawings:

Figure 1 is a vertical section of a heating utensil having the novel unit mounted therein, Figure 2 is a section on the line 2—2 of Figure 1, with the plate 10 removed and the thermostat bars shown in full lines.

Figure 3 is a detail of the dial.

While this novel heating unit is adapted to a plurality of different uses, it is here shown for purposes of accurate disclosure as mounted in a heating utensil. The utensil consists of a cylindrical body 1 having a flanged base 2, a bottom 3 and a false bottom 4, the space enclosed by the bottom and false bottom forming a compartment 5 in which the novel unit is preferably mounted. This novel unit includes a coil of electrically conducting wire 6 wound upon a base 7 of insulating material. The wire is preferably flattened and a piece of electrically insulating material 9 is positioned against the under face of the false bottom 4 of the utensil. The coil is held in position against this material 9 by means of a transverse plate 10 insulated from the coil. The plate 10 is held in adjustably clamped position by means of set screws 11 received in threaded engagement in the transverse bar 12 held in fixed position by means of the threaded rods 13 secured to the lugs 14 on the interior of the body 1.

The coil terminals are provided with connections 15 and 16 leading outside the utensil to any suitable source of electrical current—not necessary to be shown. This particular utensil embodying this novel unit is adapted for use in dental offices and is adapted to be connected to the usual office lighting circuit. In such work, as for example in heating certain plastic materials, the working temperature of the water placed in the utensil is desirably about 125 degrees F. The coil is adapted to produce heat to maintain the water at such temperature when the current traverses the whole coil. However, it is advantageous to provide means whereby the water may quickly be brought to such temperature and there maintained. To this end there is provision for the obtaining of a higher temperature. This is done by sending the full current through only a portion of the coil. A thermostat co-operates with the coil and functions after the temperature of the adjacent parts of the heating unit has passed a predetermined point, to cause the current to flow through the whole coil. In this novel device it should be noted that the circuit is not broken by the thermostat, as the thermostat simply operates to send the current through the whole coil or a portion thereof, hence the arcing at the thermostat contacts is avoided.

The thermostat is provided with one connection 17, to one side of the main circuit, while its inner connection 18 is tapped into the coil. The connection 17 is formed in circuit with a bar 19 mounted on the thermostat base 20 of insulating material. The bar carries a contact point 21 adapted normally to engage the contact point 22 carried by the thermal bar 23. This thermal bar 23 is mounted upon and is in circuit with a bar 24 secured to the insulating base 20. This bar 24 is electrically joined to the connection 18 tapped into an intermediate portion of the coil. The normal circuit, therefore, of the current is through the connection 15, and thence through that portion of the heating coil extending down to the tap, then through the connection 18, the bar 24, the thermal bar 23, contact points 22 and 21 and bar 19 and back through the connection 17. Such circuit causes the full current to traverse a portion only of the coil with the result that a relatively high heat is thereby produced and the water in the container may be quickly brought to the desired temperature. The heat thereby generated affects the thermal bar 23 so that it assumes a slightly arcuate form as indicated only at its terminal portion by the dotted lines in Figure 2. In such position contact is broken between the bar 19 and the thermostat bar and hence the tapped circuit is opened whereby the current passes from the source through the connection 15, the whole coil, and thence back through the connection 16. While this thermal bar may be formed of different materials, the bar here shown is made of a flat strip of laminated metal. One layer is of brass and the other of invar metal. The brass expands under heat at a much greater rate than the invar metal, so that when heated the bar terminally bends thereby opening the tapped circuit and causing the current to traverse the whole coil.

A signal means is preferably employed with this electric heating unit, and is here disclosed as a visual and luminous signal. It consists of a small lamp 25 having connections 26, in shunt, to substantially adjacent windings of the portion of the coil which is not cut out, so that current in passing through the whole coil, causes the lamp to burn more or less brightly, while the passage of the current through the secondary or tapped circuit causes the lamp to burn more brightly or incandescently, so that the paths of the current are, therefore, differently signaled.

In this novel structure the thermostat is provided with means not only to adjust it to function at a predetermined temperature and with an indicator so that it may be accurately adjusted, but it is also provided with means whereby such indicator adjustment may be altered to take up wear or changed when the heating unit is connected to circuits bearing currents of different strength.

The adjustment feature in this selected embodiment of the invention includes a means for regulating the normal or unheated position of the thermal bar 23 which is normally terminally held down against the contact point 21 on the bar 19. This bar 19 is inwardly held by means of a pin 27 received in threaded engagement within a rod 28 movable in a guide-way formed in the base 20. The outer portion of this rod 28 is secured within a recess formed in a stem 29 of the disk 30. The stem 29 is received in adjustable threaded engagement in the body 1. When the disk is turned, the pin 27 is moved inwardly or outwardly as conditions demand, and therefore the expandible thermostat bar 23 must move less or more, accordingly, before the circuit is altered. A dial 31 is held on the outer face of the disk 30 by means of the screw 32. This dial bears suitable temperature indicia 33, as shown in Figure 3. This dial is affixed to the disk 30. The disk may be manually rotated by means of the pin 34. A pointer 35 is fixedly secured to the body 1 of the utensil by means of the bracket 36 held by the screws 37.

Assuming that the heating unit is adjusted to a particular electric current, the pointer will correctly indicate on the dial the predetermined temperature at which the thermostat will function. However, as these heating units are employed with different circuits, as for example, in different cities, or, in circuits of different current strength in the same city, it is necessary to provide means whereby the dial may correctly indicate the predetermined temperature as it is obvious that different current strengths will produce greater or less heat in the same coil. Therefore, the dial is adjustably mounted on the disk and may be moved to corrected position after its screw 32 is loosened, whereby the dial may be reset on the disk to co-operate accurately with the pointer.

Having thus described my invention, what I claim as new and desire to secure by Letters Patent is:

1. An electric heating unit including a heating coil, means tapped in the coil at an intermediate point thereof automatically to control current flow through said coil whereby flow is directed through the whole coil or directed through only a portion thereof, and a signal means in circuit with the coil whereby flow is continuously signaled.

2. An electric heating unit including a heating coil adapted to be inserted in an electric circuit, a thermostat automatically operable to cause current to flow through the whole coil or to cause said flow to be limited to a portion thereof.

3. An electric heating unit including a heating coil, a thermostat tapped in the coil at an intermediate point thereof whereby current flow through the coil or through a portion thereof is automatically controlled.

4. An electric heating unit including a heating coil, a thermostat automatically to control current flow through said coil whereby flow is directed through the whole coil or directed through only a portion thereof, and a signal means connected in shunt to adjacent windings of the coil whereby flow is continuously signaled.

5. An electric heating unit including a heating coil terminally connected to an electrical circuit, a secondary circuit tapped in the coil at an intermediate point whereby a portion of the coil may be cut out, and luminous signal means connected in shunt to substantially adjacent windings of the portion of the coil which is not cut out whereby current passages through the whole coil or passage through secondary circuit are differently signaled.

6. An electric heating unit including a heating coil adapted to form a main circuit through connections to an electrical source, a secondary circuit tapped in the coil at an intermediate portion thereof and having a connection with said source, whereby a portion of the coil may be cut out, and a thermostat automatically to change flow from one circuit to the other without breaking current flow whereby heat generation may be controlled, and arcing is substantially avoided.

7. An electric heating unit including a heating coil in a main circuit with an electrical source, a secondary circuit connected to said source and tapped in said coil at an intermediate point thereof whereby the current normally flows through that portion only of the coil which is in the secondary circuit, and a thermostat adapted, at a predetermined temperature, to close the main and to open the secondary circuit to cause current flow through the whole coil whereby the temperature is reduced.

8. An electric heating unit including, a support a heating coil adapted to be inserted in an electric circuit, a thermostat having connections arranged to control current flow through the coil, a member bearing temperature indicia movable mounted on the support, an element secured to said member to engage and adjust the thermostat whereby the thermostat will function at a predetermined temperature, and a pointer on the support co-operable with said member, said element being adjustably secured to the member whereby the temperature indicated by said pointer on said member may be adjustably corrected.

9. An electric heating unit including a heating coil adapted to be inserted in an electric circuit, a thermostat having connections arranged to control current flow through the coil, an element movably mounted to engage and adjust the thermostat to cause the same to function at a predetermined temperature, a dial on said element and bearing temperature indicia, a pointer co-operable with said dial to indicate the temperature at which the thermostat is set to function, said dial being adjustably mounted on said element whereby, the element may be adjusted to cause the thermostat to function at a desired predetermined heat and whereby the dial may be re-set on the element to co-operate accurately with said pointer.

10. An electric heating unit including a support, a heating coil adapted to be inserted in a main electric circuit, a secondary circuit tapped in the coil at an intermediate point whereby a portion of the coil may be cut out, spaced contacts between the main and secondary circuits, a thermostatic member extending between said contacts and movable in response to temperature changes to close and open the secondary circuit, a member movably mounted in the support and adapted to engage and move one of said contacts whereby the contacts may be held in adjusted spaced relation whereby the temperatures at which the thermostatic member will open or close the secondary circuit may be selectively predetermined, a disk having said member secured thereto, the disk having threaded engagement with the support whereby upon disk rotation, said member is moved to alter the spaced relation of said contacts, a dial adjustably mounted on said disk and a co-operable pointer carried by the support.

In witness whereof I have hereunto set my hand this day of August 5th 1920.

CLARENCE B. ROGERS.

Witnesses:
W. W. DEARBORN,
W. E. DWYER.